Sept. 9, 1952 E. C. MOSS 2,609,609
GAUGE FOR CHECKING PARTS OF CYLINDRICAL ARTICLES
Filed July 10, 1946 7 Sheets-Sheet 1

INVENTOR
E.C. MOSS
BY
ATTORNEY

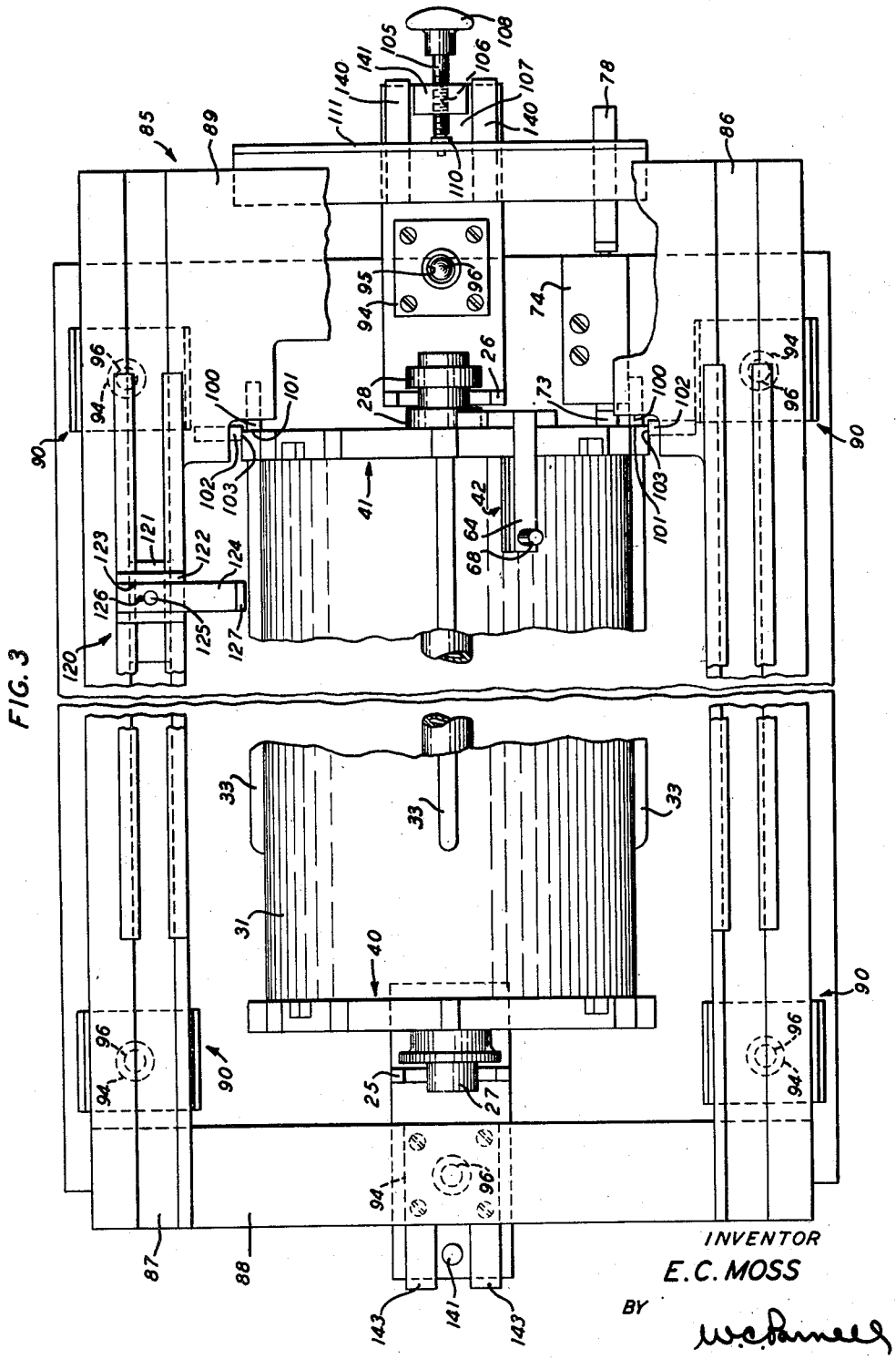

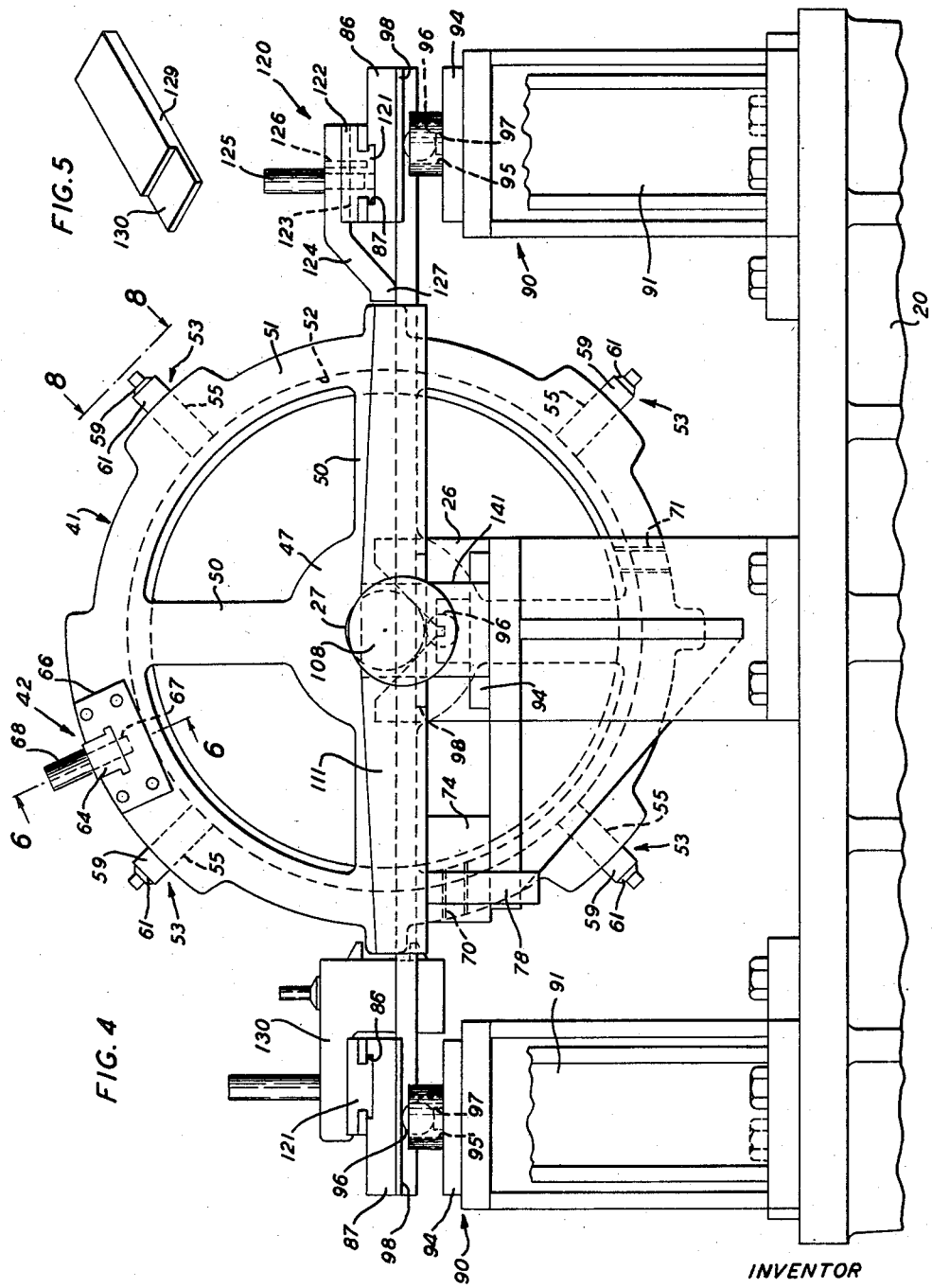

Sept. 9, 1952  E. C. MOSS  2,609,609
GAUGE FOR CHECKING PARTS OF CYLINDRICAL ARTICLES
Filed July 10, 1946  7 Sheets-Sheet 5
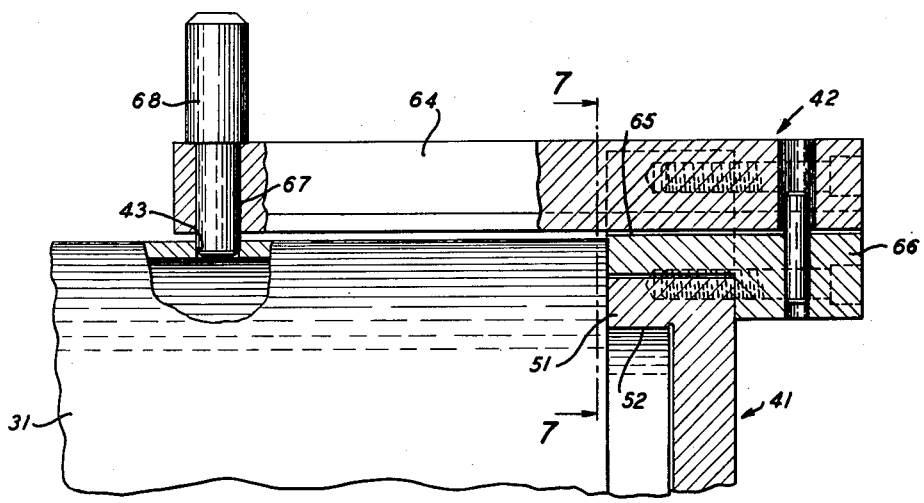
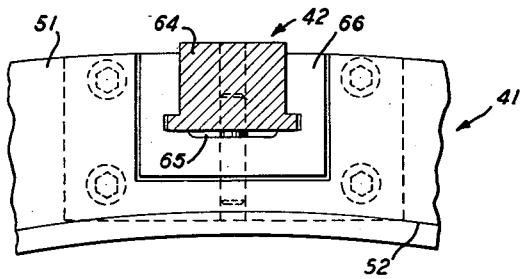
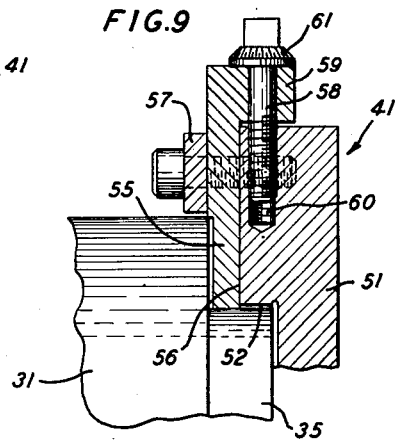
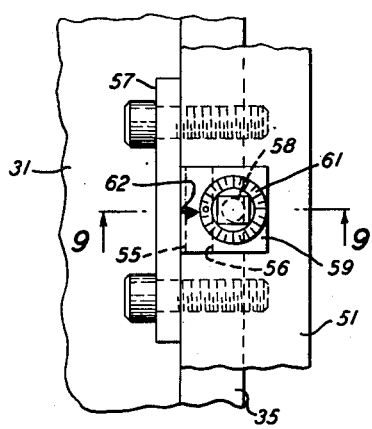
INVENTOR
E. C. MOSS
BY
W. C. Parnell
ATTORNEY Sept. 9, 1952 E. C. MOSS 2,609,609
GAUGE FOR CHECKING PARTS OF CYLINDRICAL ARTICLES
Filed July 10, 1946 7 Sheets-Sheet 6

INVENTOR
E.C.MOSS
BY
*W.C.Parmeer*
ATTORNEY

Sept. 9, 1952 E. C. MOSS 2,609,609
GAUGE FOR CHECKING PARTS OF CYLINDRICAL ARTICLES
Filed July 10, 1946 7 Sheets-Sheet 7
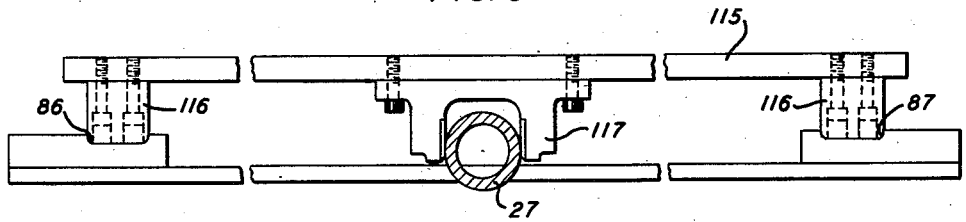
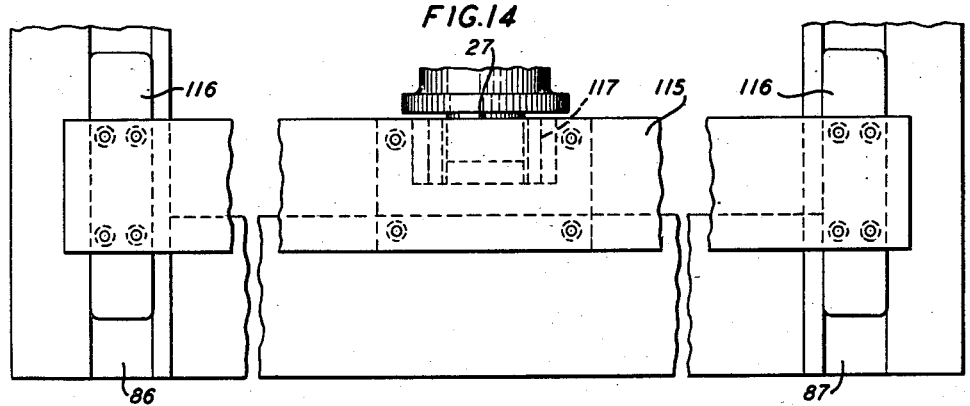
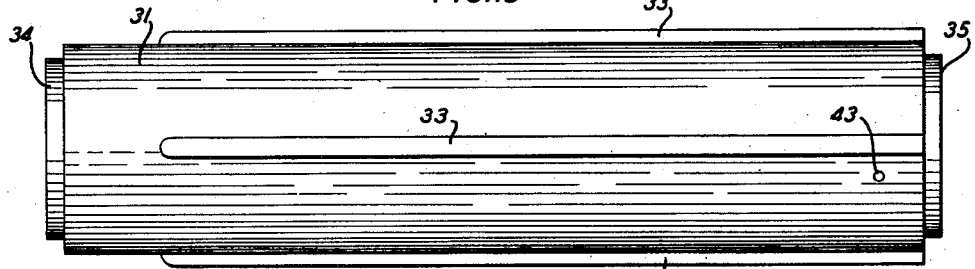
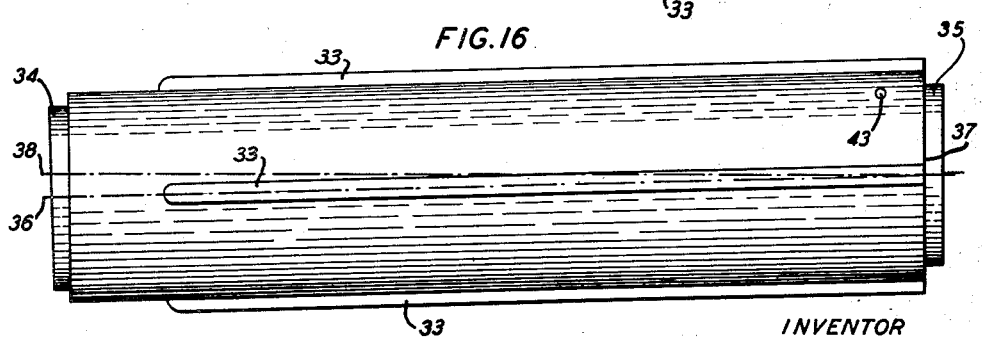
INVENTOR
E. C. MOSS
BY W. C. Parnell
ATTORNEY Patented Sept. 9, 1952

2,609,609

UNITED STATES PATENT OFFICE 2,609,609

GAUGE FOR CHECKING PARTS OF CYLINDRICAL ARTICLES

Earl C. Moss, Westfield, N. J., assignor to Western Electric Company, Incorporated, New York, N. Y., a corporation of New York Application July 10, 1946, Serial No. 682,673

4 Claims. (Cl. 33—174)

This invention relates to gages, particularly gages for checking various dimensions on large cylindrical articles.

In the manufacture of various kinds of apparatus and equipment, it is necessary to check the alignment or relationship of various parts with respect to given positions with a high degree of accuracy. In such instances conventional types of gages are employed whenever possible. However, the introduction of new structures and the strict requirements associated with the manufacture thereof, necessitate the development of gages capable of checking the specified requirements of the new structure.

An object of the invention is to provide a gage which is simple in structure and highly efficient for checking various portions of large cylindrical articles.

Broadly, the invention comprises a supporting shaft carried centrally by spaced heads adapted to be mounted on the ends of a cylindrical article to be gaged so that the centerline of the shaft will be coincident with the centerline of the article. Suitable means support the ends of the shaft for rotary movement with the article. A table, for use in supporting gaging units, is mounted for movement in a given plane relative to the article into positions parallel with the centerline of the article or with a centerline perpendicular to one end of the article.

In the present embodiment, the article is to house certain units or other structures, some of which must be mounted on or within the article at given positions with respect to the centerline of the article while others must be mounted with respect to a centerline perpendicular to one of the flanged ends of the article. In the present instance, the overall length of the article including the flanged ends must be within a given measurement (approximately six feet) plus or minus ($\pm$) $\frac{1}{32}$. It may therefore be possible for one side of the flange in question to have a minus (—) $\frac{1}{32}$ dimension while the diametrically opposed portion of the flange may have a plus (+) $\frac{1}{32}$ dimension. In this instance, the centerline of the flange would not be coincident with the centerline of the article, but would extend at an angle with respect thereto. Separate means are therefore employed for positioning the table so that the sides thereof, which are to support gaging units, will lie either parallel with the true centerline of the article or parallel with the centerline perpendicular to the end of the article or the face of the flange thereof.

Other objects and advantages will be apparent from the following detailed description when considered in conjunction with the accompanying drawings, wherein Figs. 1 and 2 combined illustrate a side elevational view of the gage with an article mounted in a gaging position;

Fig. 3 is a fragmentary top plan view of the structure shown in Figs. 1 and 2 combined;

Fig. 4 is an end elevational view of the gage, portions thereof being broken away;

Fig. 5 is a perspective view of a gaging element employed in conjunction with one of the gaging units mounted on the table;

Fig. 6 is an enlarged fragmentary sectional view taken along the line 6—6 of Fig. 4;

Fig. 7 is a fragmentary sectional view taken along the line 7—7 of Fig. 6;

Fig. 8 is an enlarged fragmentary detailed view taken substantially along the line 8—8 of Fig. 4;

Fig. 9 is a fragmentary sectional view taken along the line 9—9 of Fig. 8;

Fig. 13 is an end elevational view of the table illustrating the means to hold the table with its sides parallel with the centerline of the article;

Fig. 14 is a fragmentary top plan view of the structure shown in Fig. 13; and

Figs. 15 and 16 are views of the article.

Figure 11:
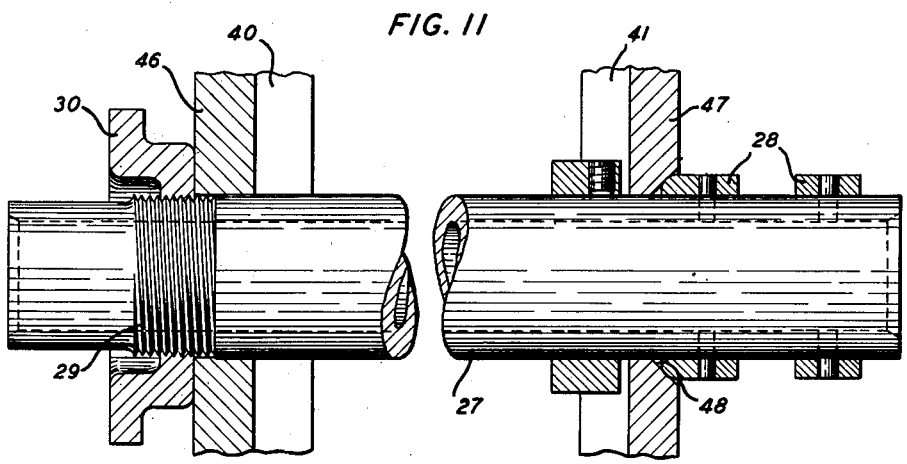
Fig. 11 is a fragmentary sectional view of the heads mounted upon the supporting shaft.
Figure 12:
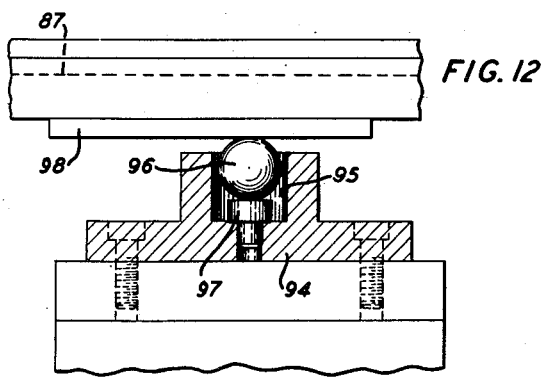
Fig. 12 is an enlarged fragmentary sectional view of one of the supporting units for the table.

Referring now to the drawings, the gage includes a base 20 supported by legs 21 adjustable through the aid of screws 22 to position the upper surface 23 of the base in a truly horizontal plane. V-blocks 25 and 26 are mounted upon the surface 23 of the base 20 at spaced positions to receive a supporting shaft 27. The shaft 27 as shown in Fig. 11 is of a tubular structure having spaced collars 28 mounted adjacent one end thereof, the opposite end of the shaft having a threaded portion 29 to receive a nut 30.

The article 31 in the present instance is cylindrical in general contour and is hollow for the mounting of various articles, units or other structures therein. Ribs 33 which are U-shaped in cross section are mounted at equally spaced positions on the periphery of the article by suitable means such as welding. End flanges 34 and 35 are formed integrally with the ends of the article or secured thereto by suitable means such as welding. A centerline of the article 31 is identified by a dot-dash line 36 while a centerline perpendicular to the face 37 of the flange 35 is identified by a dot-dash line 38.

The article 31 is mounted upon the shaft 27 by the aid of heads 40 and 41 which are identical in structure with two exceptions, one being a locating unit 42 mounted upon the head 41 to locate the head on the article with respect to a reference hole or aperture 43 in the article. The other point of difference between the heads 40 and 41 will be hereinafter described. The heads 40 and 41 have hub portions 46 and 47 respectively (Fig. 11) which are centrally apertured to receive the shaft 27. A tapered portion 48 of the aperture in the hub 47 cooperates with the adjacent collar 28 when the nut 30 is tightened on the shaft to draw the heads in close engagement with their respective flanges 34 and 35. Spokes 50 connect the hubs of the heads to their rims 51 which have annular recesses 52 therein to freely receive their flanges (34—35). Spaced clamping units indicated generally at 53 are shown in detail in Figs. 8 and 9. Each clamping unit includes a clamping jaw 55 movably mounted in a recess 56 of its rim and held against displacement in the recess by a bar 57. A threaded element 58 extending freely through an aperture in a laterally extending portion 59 of the jaw is receivable in a threaded aperture 60 of its rim. A calibrated dial 61 is mounted on the outer portion of the element 58 and may be rotated with the element relative to a pointer 62 at a fixed position on the jaw 55.

There are four clamping units for each head, these units being positioned 90° apart, two above and two below the horizontal centerline of each head. Through the aid of the calibrated dials on the elements, the heads may be disposed upon their respective flanges with the upper clamping units in outer positions so that their inner ends will be beyond the inner periphery of the recesses 52 permitting the heads to rest directly upon their flanges free of the clamping units. The lower clamping units are then moved inwardly like distances until the inner ends of the jaws engage their flanges. The operator then moves the upper clamping units inwardly until they are stopped by engagement of the jaws with their flanges. The operator may then determine the difference in reading of the calibrated members or dials 61 of the upper units and the lower units and make the necessary adjustments so that the readings of all clamping units of each head will be the same. For example, if the upper indicating units are at zero positions and the lower indicating units are each at number 10 positions, the lower units may be adjusted to number 5 positions allowing the upper units to also be adjusted to number 5 positions at which time the operator knows that the heads and the shaft are mounted concentrically with the article, the centerline of the shaft being coincident with the centerline of the article.

The unit 42 includes an arm 64 having one end mounted in a groove 65 of a bracket 66 fixed to the rim 51 and extending through a recess 66 in the rim. The free end of the arm has an aperture 67 therein to receive a locating pin 68, the inner end of which is receivable in the reference hole 43 of the article 31.

Figure 1:
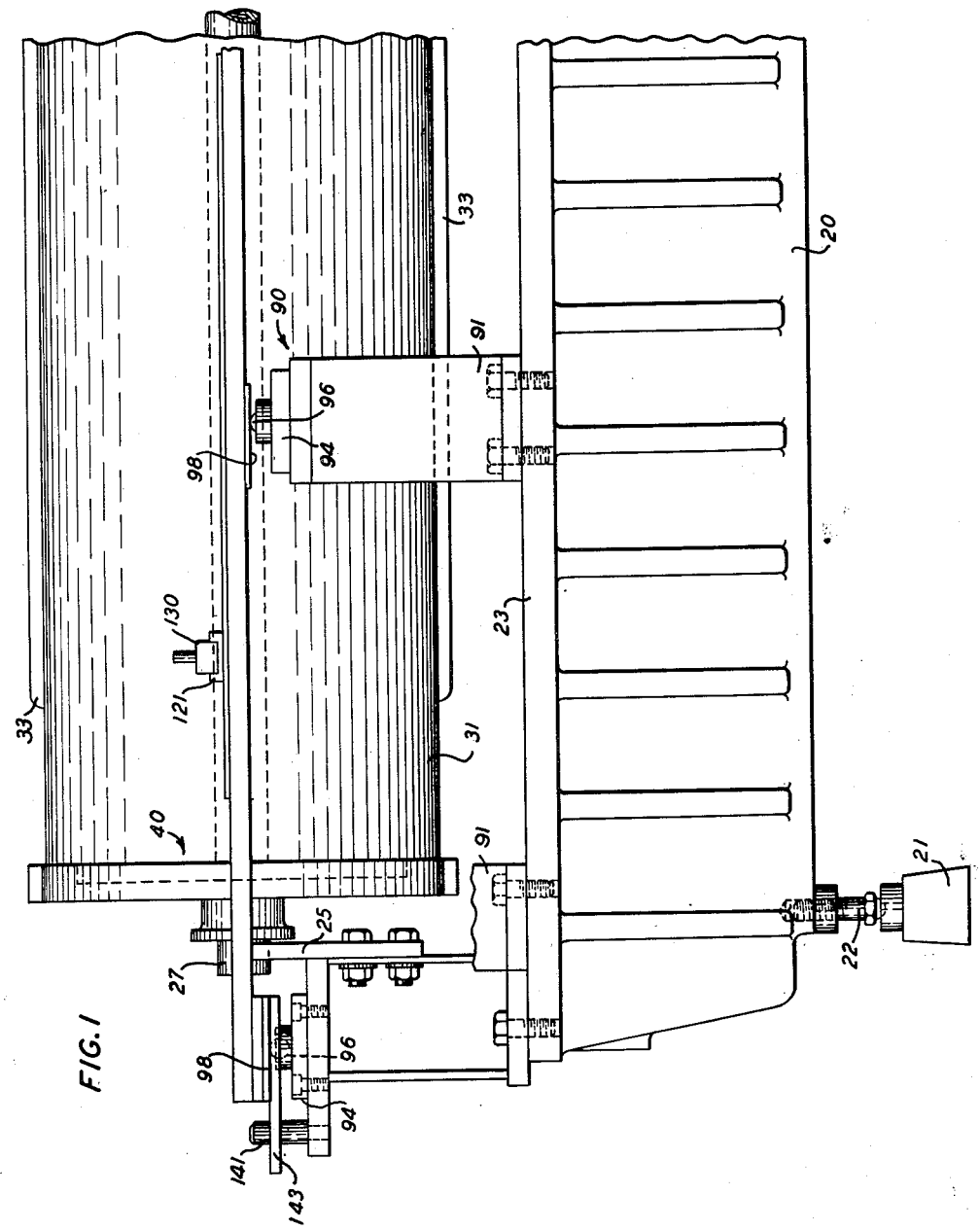
Figure 2:
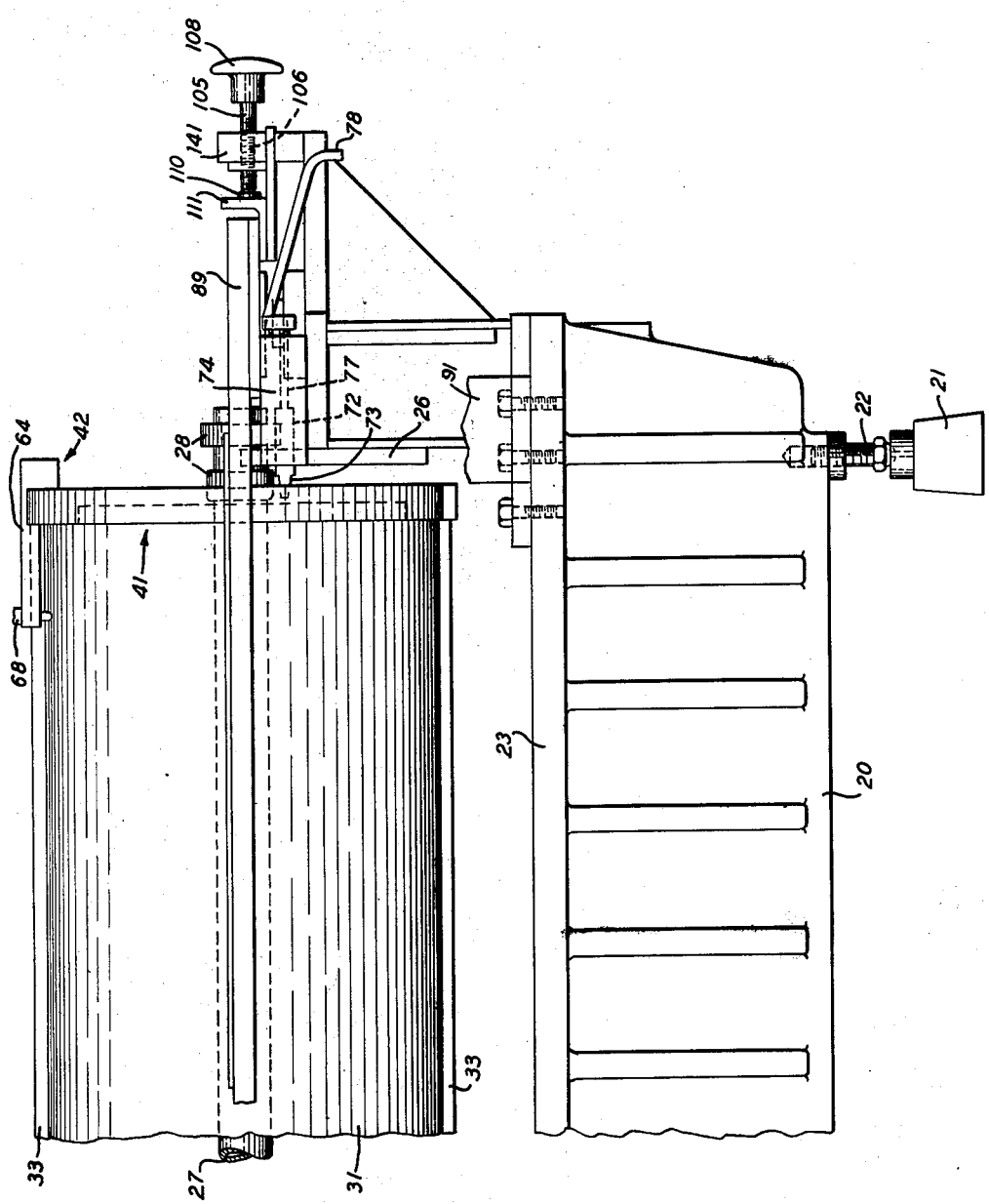
Figure 10:
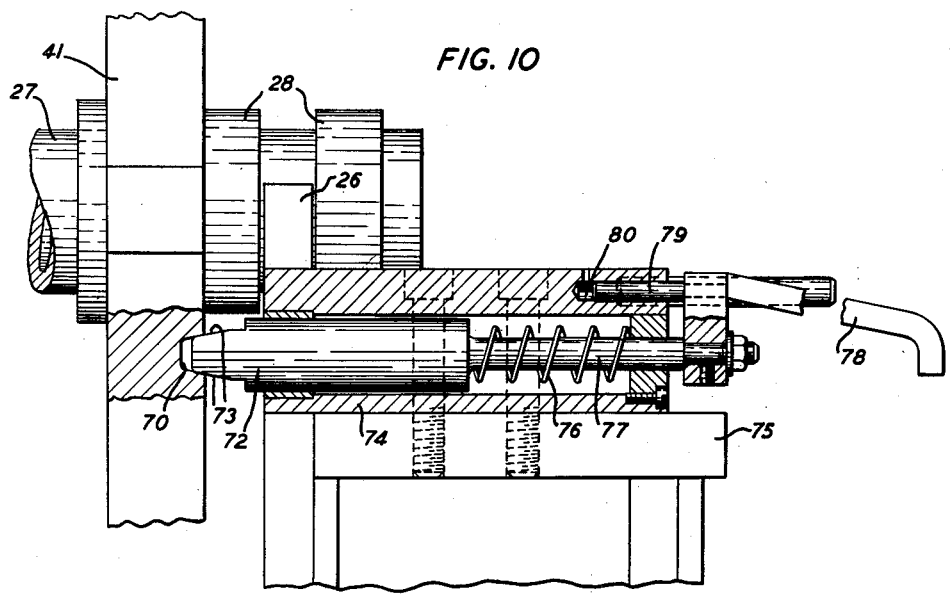
Fig. 10 is an enlarged fragmentary sectional view of a locking mechanism.

The other feature of difference between the head 41 and the head 40 includes notches 70 and 71 disposed 90° apart in the rim of the head 41 to receive the leading end of a latch 72 (Fig. 10). The side walls of the notches 70 and 71 are tapered and so are the side walls 73 of the leading end of the latch to function in accurately positioning the article in either of two gaging positions. The latch 72 is supported for longitudinal movement in a housing 74, mounted upon a bracket 75 of the base 20. A spring 76 disposed in the housing 74 concentric with a reduced portion 77 of the latch normally urges the latch to the left and serves to hold it in either of the grooves 70 or 71. A handle 78 is provided for movement of the latch out of one notch so that the article, with its heads, may be rotated to the next gaging position. A pin 79 carried by the handle 78 is positioned to ride in an aperture 80 of the housing 74 to hold the latch against turning.

A table indicated generally at 85 is composed of grooved guides 86 and 87 parallel with each other and connected at their outer ends by cross members 88 and 89 completing a rectangular structure. A plurality of supporting units 90 for the table includes vertical blocks 91 mounted upon the surface 23 of the base 20 and supporting retaining members or elements 94 upon the upper ends thereof. The elements 94 include cup-like portions 95 for ball members 96 and hardened metal seats 97. Hardened metal plates 98 are secured to the under surface of the table adjacent the units 90, the plates resting upon the ball members 96 of their respective units. The supporting units 90 maintain the guides 86 and 87 in a plane parallel with a true horizontal plane extending through the centerlines of article 31 and the shaft 27. Furthermore, the table is free to be moved in its plane on the ball members 96 so that the grooves of the guides 86 and 87 may be positioned parallel with the centerline of the article or parallel with the centerline perpendicular to the face 37 of the article.

To accomplish one of the locating features, locating elements 100, mounted at spaced positions on the cross member 89 of the table, have accurately machined ends 101 to engage the outer or adjacent surface of the head 41, the surfaces 101 lying in a plane perpendicular to the grooves 86 and 87. Other locating elements 102 mounted on the cross member 89 of the table have accurately machined surfaces 103 parallel with each other and with the guide members 86 and 87 to engage the periphery of the head 41. Associated with the locating elements 100 and 102 is a threaded member or screw 105 supported in a threaded aperture 106 of a bracket 107 mounted on the base 20. A hand wheel 108 mounted upon the threaded element 105 may be employed in rotating the element toward or away from a hardened metallic member 110 of a flange 111 mounted upon the cross member 89 of the table. With the head 41 mounted upon its flange 35 so that its outer surface will lie parallel with the face 37 of the flange 35 due to the inner surface of the head engaging the face 37, the table, through the tightening of the threaded element, 105 will be moved to a position where the guides 86 and 87 will be equal distances from and parallel with the centerline perpendicular to the face 37. This is accomplished by forcing the locating elements 100 and 102 in close engagement with the head 41, the head with the article being held against longitudinal movement by the collars 28, positioned upon both sides of the V-block or member 26.

To locate the table so that the guide members 86 and 87 will be parallel with the centerline of the article and the centerline of the shaft, an aligning element 115 is formed to extend laterally of the table near the head 40. The element includes shoes 116 mounted near its ends and formed to fit snugly in the adjacent portions of the guides 86 and 87. Through this means, the element is held perpendicular to the guides. A yoke 117 mounted at the center of the element 115 has hardened and accurately machined inner surfaces to engage diametrically opposed portions of the shaft 27. When the aligning element 115 is in the position shown in Figs. 13 and 14, assuming that the table is free for movement through the loosening of the element 105, the table is moved into a position where the guides 86 and 87 will be parallel with the true centerline of the article.

One of the units for gaging or checking parts of the article is indicated generally at 120 in Figs. 3 and 4. This unit includes a slide 121 receivable in either of the guides 86 or 87 of the table 85 and movable in paths therein either parallel with the centerline of the article or parallel with the centerline perpendicular to the end or face 37 of the article. An upper portion 122 of the slide is grooved laterally at 123 to receive an element 124 removably held in place by a threaded handle 125 assisted by a pin 126, both the handle and the pin extending through apertures in the element 124 and into apertures in the portion 122 of the slide. An inner end or face 127 of the element 124 is machined accurately to lie parallel with its guide a given distance therefrom closely adjacent the rib or part 33 of the article in the gaging position.

A gaging member 129, having a leading portion 130 of a given thickness and the remaining portion of the member being of greater thickness, is used in conjunction with the element 124 to check the location of the part 33 at various portions of its length. If the leading portion 130 only of the gaging member 129 is receivable between the element 124 and the part 33 of the article the operator will know that the portion being gaged is satisfactory. However, if the leading portion 130 is not receivable between the element 124 and the part being gaged, or if the thicker portion of the gaging member 129 is receivable between the element 124 and the part, both these conditions will indicate to the operator an unsatisfactory condition in the part or article. In one instance, it may indicate to the operator a defective condition resulting from the mounting of the part 33 on the article, while under other conditions, the operator may determine whether or not the plane of the surface 37 of the flange of the article is within predetermined limits of a given position with respect to the centerline of the article. These various checks may be made at selected portions of the parts 33 throughout their lengths.

Other gaging units may be employed for gaging other features of the article either externally or internally thereof. For external gaging, the guides 86 and 87 are employed together with the slide 121. Another gaging unit 130 (Fig. 4) is mounted upon the slide 121 or a slide identical in structure therewith. In the present embodiment, the unit 130 with its slide is mounted for longitudinal movement on the guide 86. In actual practice, gaging operations, usually by like gaging units, are performed simultaneously upon opposite sides of the article utilizing both guides 86 and 87. When one gaging operation has been completed, the gaging units for that operation may be removed from the guides and other gaging units for subsequent gaging operations may be mounted on the guides. The gaging unit 130 is the subject matter of Patent 2,455,516 and is employed to gage the center lines of the parts 33 with respect to the centerline of the article. Other gaging units employed for checking parts mounted within the article are disclosed in my copending application, Serial No. 682,676, filed June 10, 1946, and Patent 2,470,635.

In preparing the article 31 to be gaged, the heads 40 and 41 are mounted upon the ends or flanges 34 and 35 of the article and the shaft 27 is mounted in place prior to the positioning of the article in the main portion of the gage. As previously described, the heads 40 and 41 are equipped with clamping units 53 making possible the accurate mounting of the heads on the flanges of the article whereby the central apertures of the hubs 46 and 47 will have their centerlines in alignment with each other and coincident with the centerline of the article. Furthermore, the recesses 52 in the heads are formed so that the outer faces of the heads, particularly the head 41, will lie in planes parallel with the faces of their flanges 34 and 35. This is important in determining the relationship of the two centerlines of the article, namely, the general centerline 36 thereof and the centerline 38 which is perpendicular to the face 37 of the leading end or flange 35.

Through the aid of the unit 42 which is a part of the head 41, the head 41 is positioned so that the latch receiving notches 70 when cooperating with the latch 72 will accurately locate either pair of ribs or parts 33 of the article in gaging positions. The unit 42 therefore functions during the positioning of the head 41 on its flange 35 and prior to the securing of the clamps 53 to the flange 35.

After the heads 40 and 41 are mounted in place on their respective flanges of the article and the shaft 27 is secured in the apertures of the hubs of the heads, this assembly is transported by the aid of any suitable means through the opening in the table 85, until the ends of the shaft come to rest in their V-blocks. The assembly is then rotated to a position where the latch 72 will engage one of its notches 70 or 71. In the present illustration, the latch engages the notch 70 positioning two of the parts 33 for gaging adjacent the guides 86 and 87. The operator may then begin the necessary gaging operations. To check the face of the flange 35, the operator rotates the hand wheel 108 (Fig. 3) to move the table 85 until the locating elements 109 firmly engage the face of the head 41 and in so doing, the head is accurately positioned between the locating elements 102. This operation positions the guides 86 and 87 of the table parallel with the centerline 38 (Fig. 16) or perpendicular to the face 37. The necessary units, for example, the unit 120, may be disposed on either or both guides 86 and/or 87 where the operator may gage various portions of the article or parts thereof assisted by the gaging member 129. When these gaging operations have been completed, with the table 85 in this position, the table may be freed by loosening the threaded member 105 so that the head 41 may be free of the locating elements 100 yet continue to remain between and under the control of the locating elements 102. The locating element 115 (Figs. 13 and 14) may then be placed upon the table with its shoes 116 nesting in the guides 86 and 87 and the yoke 117 straddling the adjacent end of the shaft 27. When this has been accomplished, the guides 86 and 87 are parallel with the general centerline of the article, and through the aid of gaging units, other parts of the article may be checked.

The table 85 has been described as being free to move in any direction in a true horizontal plane on the ball members 96. Although this is true, to the extent required for positioning the guides of the table equal distances from either of the centerlines 36 or 38 of the article, the table is held against movement undesired distances by fingers 140 carried by the table, or more specifically the flange 111 thereof, and positioned upon each side of a vertical portion 141 of the bracket 107 to control the adjacent end of the table against movement beyond given limits. Similar fingers 143 mounted on the cross member 88 of the table are positioned upon opposite sides of a vertical pin 144 and through this structure the adjacent end of the table is held against movement beyond given limits.

Although specific improvements of the invention have been shown and described, it will be understood that they are but illustrative and that various modifications may be made therein without departing from the scope and spirit of this invention as defined by the appended claims.

What is claimed is:

1. In a gage, for checking parts of cylindrical articles, heads for mounting on the ends of a cylindrical article and having central apertures therein, clamps disposed at spaced positions adjacent the outer peripheries of the heads and supported by the heads for radial movement thereon relative to the centerlines of the apertures, calibrated elements carried by the heads for moving their respective clamps measured distances whereby the heads may be firmly secured to their ends of the article and the centerlines of the said apertures located in alignment with each other and coincident with the centerline of the article, a shaft to rotatably support the heads and the article extending through the apertures in the heads and through the article with its axis coincident with their centerlines, means to support the shaft whereby its axis and the centerline of the article will lie in a given plane, a table having a guide portion extending longitudinally of the table and the article, means to support the table for movement in a plane parallel with the said given plane of the axis of the shaft and the centerline of the article, an element removably connecting the guide portion and the shaft to locate and hold the table with the guide portion thereof parallel with the centerline of the article, and a gaging unit movable in the said guide portion to gage the position of a part of the cylindrical article relative to the centerline of the article.

2. In a gage, for checking parts of cylindrical articles, heads for mounting on the ends of a cylindrical article and having central apertures therein, clamps disposed at spaced positions adjacent the outer peripheries of the heads and supported by the heads for radial movement thereon relative to the centerlines of the apertures, calibrated elements carried by the heads for moving their respective clamps measured distances whereby the heads may be firmly secured to their ends of the article and the centerlines of the said apertures located in alignment with each other and coincident with the centerline of the article, a shaft to rotatably support the heads and the article extending through the apertures in the heads and through the article with its axis coincident with their centerlines, means to support the shaft whereby its axis and the centerline of the article will lie in a given plane, a table having a guide portion extending longitudinally of the table and the article, means to support the table for movement in a plane parallel with the said given plane of the axis of the shaft and the centerline of the article, a mechanism cooperating with one of the heads to locate and hold the table against movement with the guide portion thereof parallel with a centerline perpendicular to the adjacent end of the article, and a unit movable on the guide portion of the table to check the position of a portion of the article relative to the said end of the article.

3. In a gage for checking parts of cylindrical articles, heads for mounting on the ends of a cylindrical article and having central apertures therein, clamps disposed at spaced positions adjacent the outer peripheries of the heads and supported by the heads for radial movement thereon relative to the centerlines of the apertures, calibrated elements carried by the heads for moving their respective clamps measured distances whereby the heads may be firmly secured to their ends of the article and the centerlines of the said apertures located in alignment with each other and coincident with the centerline of the article, a shaft to rotatably support the heads and the article extending through the apertures in the heads and through the article with its axis coincident with their centerlines, means to support the shaft whereby its axis and the centerline of the article will lie in a given plane, a table with a central aperture, larger than the article whereby the table may surround the article and have sides with parallel guide portions extending longitudinally of the sides and the article, means to support the table in a position where it will surround the article and be free for movement in a plane parallel with the said given plane of the axis of the shaft and the centerline of the article, and a gaging unit movable in either guide portion to gage the positions of parts of the cylindrical article relative to the centerline of the article.

4. In a gage for checking parts of cylindrical articles, heads for mounting on the ends of a cylindrical article and having central apertures therein, clamps disposed at spaced positions adjacent the outer peripheries of the heads and supported by the heads for radial movement thereon relative to the centerlines of the apertures, calibrated elements carried by the heads for moving their respective clamps measured distances whereby the heads may be firmly secured to their ends of the article and the centerlines of the said apertures located in alignment with each other and coincident with the centerline of the article, a shaft to rotatably support the heads and the article extending through the apertures in the heads and through the article with its axis coincident with their centerlines, means to support the shaft whereby its axis and the centerlines of the article will lie in a given plane, a table with a central aperture, larger than the article whereby the table may surround the article and have sides with parallel guide portions extending longitudinally of the sides and the articles, means to support the table in a position where it will surround the article, a mechanism cooperating with one of the heads to locate and hold the table against movement with the guide portions of the sides parallel with a centerline perpendicular to the adjacent end of the article which may not be perpendicular to the centerline of the article, and a unit movable on either guide portion to gage portions of the article relative to the said end portion.

EARL C. MOSS.

REFERENCES CITED

The following references are of record in the file of this patent:

UNITED STATES PATENTS

| Number | Name | Date |
|---|---|---|
| 470,912 | Durand | Mar. 15, 1892 |
| 770,546 | Teas | Sept. 20, 1904 |
| 1,231,479 | Blumer | June 26, 1917 |
| 1,534,408 | Panott | Apr. 21, 1925 |
| 1,652,435 | Goodrich | Dec. 13, 1927 |
| 1,938,216 | Damerell | Dec. 5, 1933 |
| 2,359,018 | Balk | Sept. 26, 1944 |
| 2,366,394 | Gerber | Jan. 2, 1945 |
| 2,417,409 | Garrison | Mar. 18, 1947 |
| 2,495,891 | Davis | Jan. 31, 1950 |

FOREIGN PATENTS

| Number | Country | Date |
|---|---|---|
| 475,229 | Germany | Apr. 20, 1929 |